United States Patent [19]
Vallat

[11] Patent Number: 5,945,662
[45] Date of Patent: Aug. 31, 1999

[54] CONNECTOR FOR A SMART CARD READER APPARATUS

[75] Inventor: Bernard Vallat, Lattes, France

[73] Assignee: Framatome Connectors International, Paris La Defense Cedex, France

[21] Appl. No.: 08/913,395

[22] PCT Filed: Mar. 21, 1996

[86] PCT No.: PCT/FR96/00428

§ 371 Date: Dec. 30, 1997

§ 102(e) Date: Dec. 30, 1997

[87] PCT Pub. No.: WO96/29672

PCT Pub. Date: Sep. 26, 1996

[30] Foreign Application Priority Data

Mar. 22, 1995 [FR] France .................................. 95 03346

[51] Int. Cl.[6] .................................................. G06K 19/06
[52] U.S. Cl. .......................... 235/492; 235/441; 439/630; 439/489
[58] Field of Search ..................................... 235/441, 492, 235/444, 483, 485, 435; 439/630, 489, 188

[56] References Cited

U.S. PATENT DOCUMENTS

| | | | |
|---|---|---|---|
| 4,004,133 | 1/1977 | Hannan et al. | 235/441 |
| 4,017,834 | 4/1977 | Cuttill et al. | 340/149 |
| 4,575,703 | 3/1986 | Shishido | 235/479 |
| 4,675,516 | 6/1987 | Guion | 235/441 |
| 4,900,273 | 2/1990 | Pernet | 439/630 |
| 5,031,599 | 7/1991 | Hirata | 235/438 |
| 5,463,210 | 10/1995 | Imura | 235/441 |

FOREIGN PATENT DOCUMENTS

| | | | |
|---|---|---|---|
| 0 139 593 A1 | 10/1984 | European Pat. Off. | G06K 7/06 |
| 0 316 699 A1 | 11/1988 | European Pat. Off. | G06K 13/08 |
| 0 363 871 A2 | 10/1989 | European Pat. Off. | G11C 5/00 |
| 0 595 305 A1 | 10/1993 | European Pat. Off. | G06K 7/01 |

*Primary Examiner*—Michael G. Lee
*Assistant Examiner*—Diane I. Lee
*Attorney, Agent, or Firm*—Pollock, Vande Sande & Amernick

[57] ABSTRACT

A connector (1) for an apparatus for reading smart card (C), having a body supporting brush contact elements (Bc1, Bcx) for electrically contacting the conductive pads of a chip on a card (C) inserted into the connector. The connector includes an electronic circuit connected to a least some of the brush contact elements (B) and connectable to the electronic circuit of the card reader. The electronic circuit on the connector includes an arrangement for controlling the insertion of the card (C) into the card reader and its withdrawal therefrom, and one of the brush contact elements (Bxc) is at a second predetermined potential and offset in relation to the other brush contact elements (Bc1) so that once the card (C) has been properly inserted into the connector, one of two events occurs when the card is withdrawn and before the other brush contact elements are disengaged from the conductive pads ($C_1$) of the card (C) that they are contacting. Specifically, either the brush contact element ($Bc_1$) at the predetermined potential and the brush contact element at a so-called earth potential are short-circuited, or the second potential varies with a magnitude no smaller than a predetermined threshold.

10 Claims, 6 Drawing Sheets

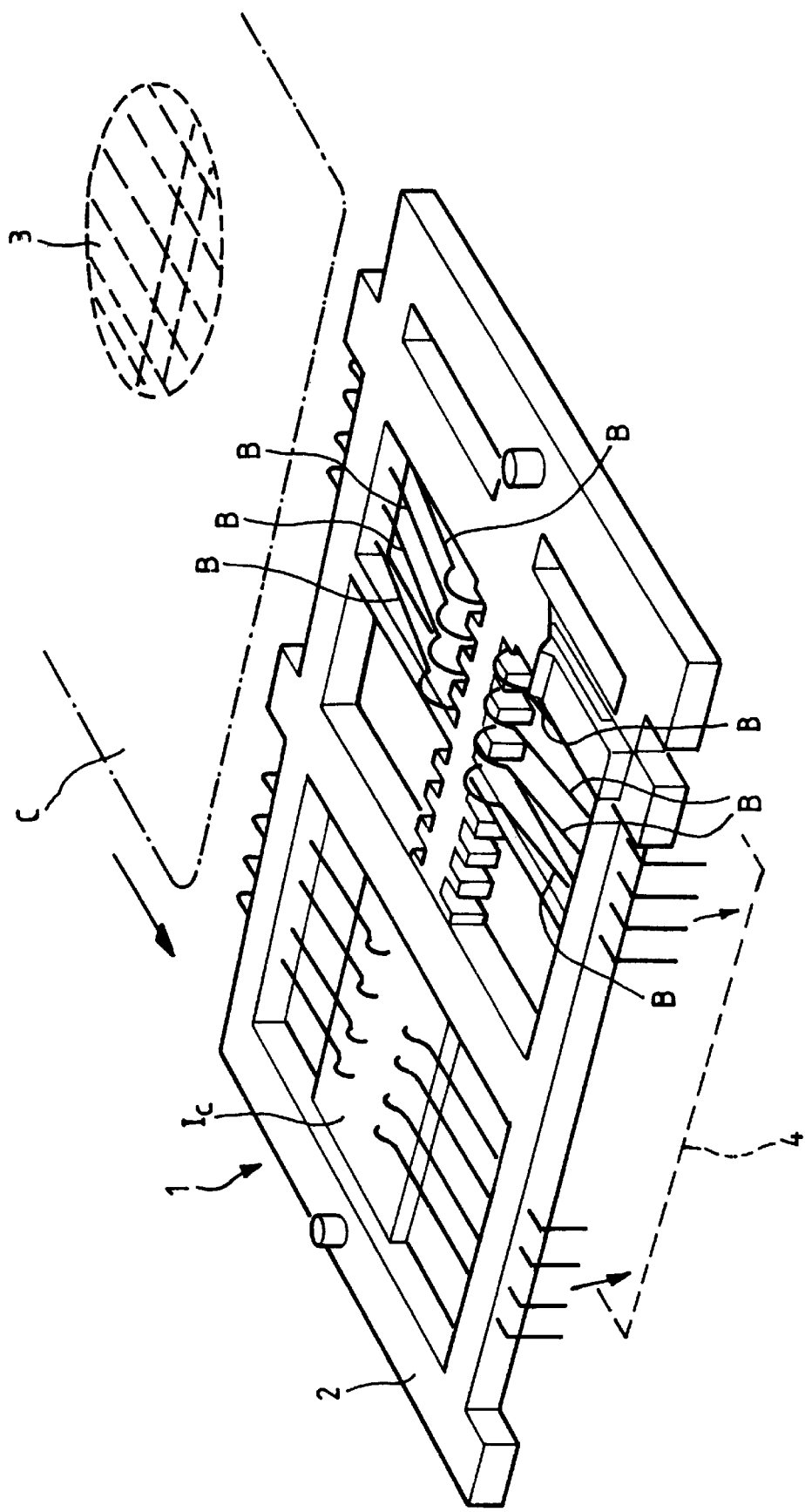

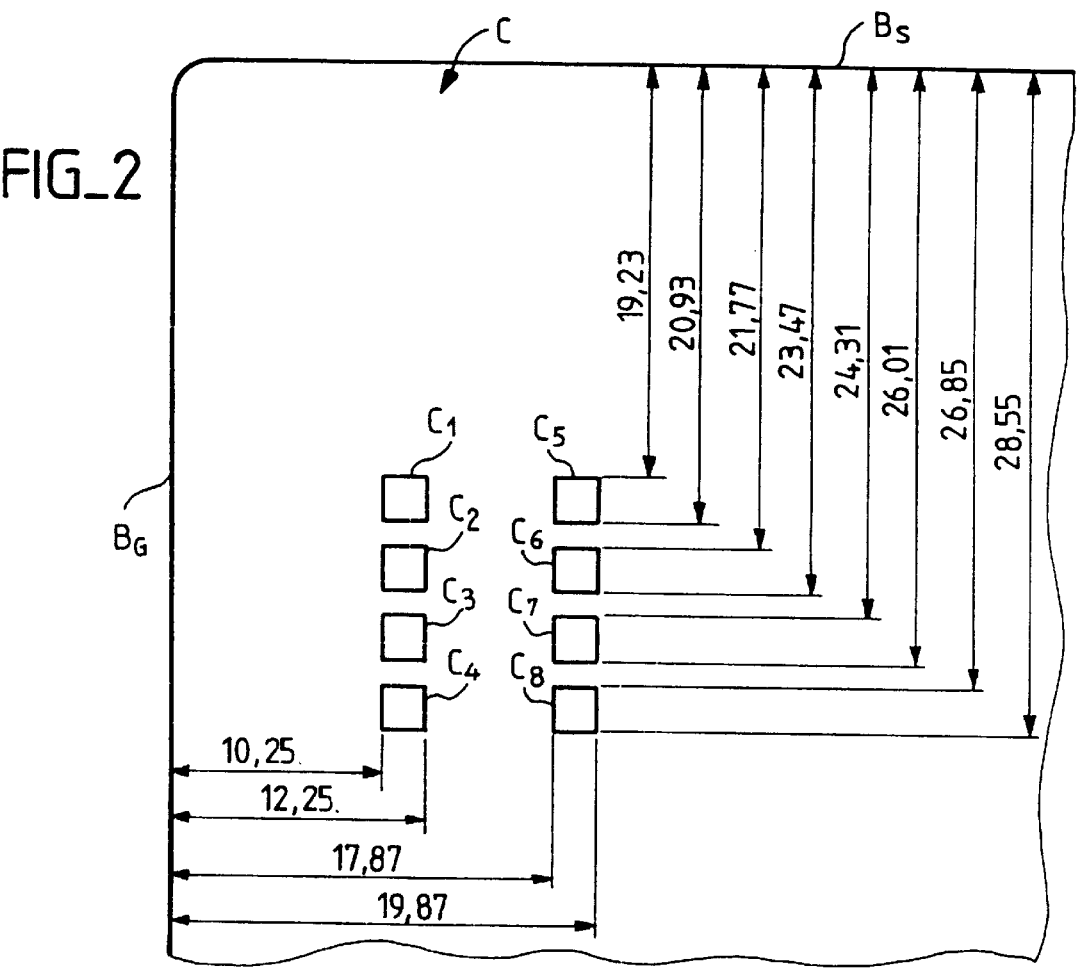
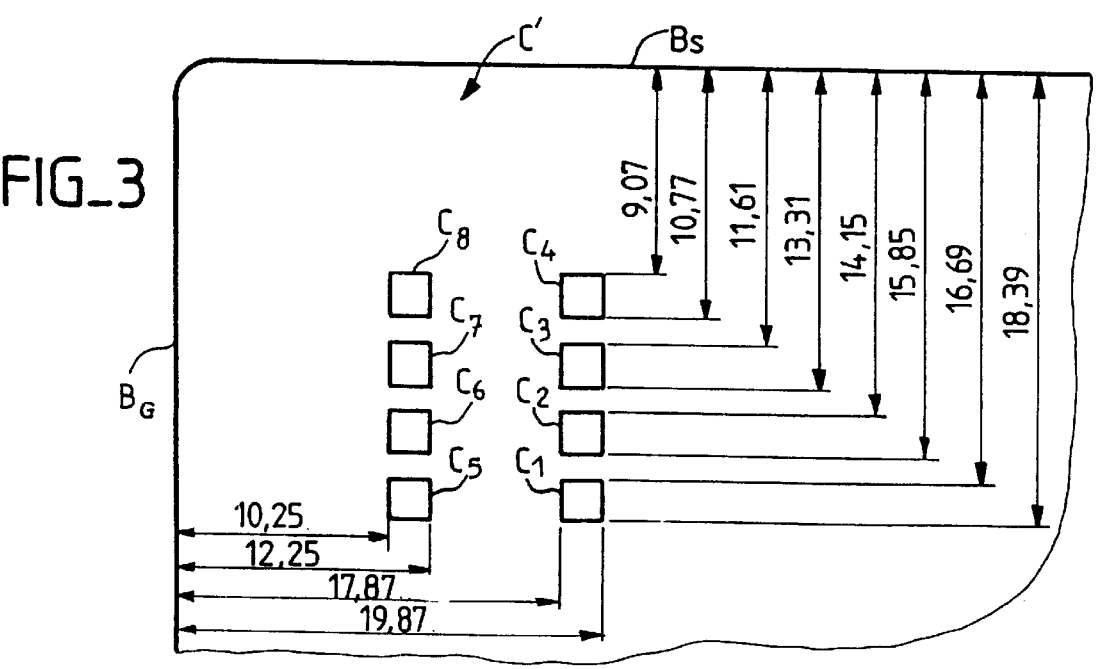

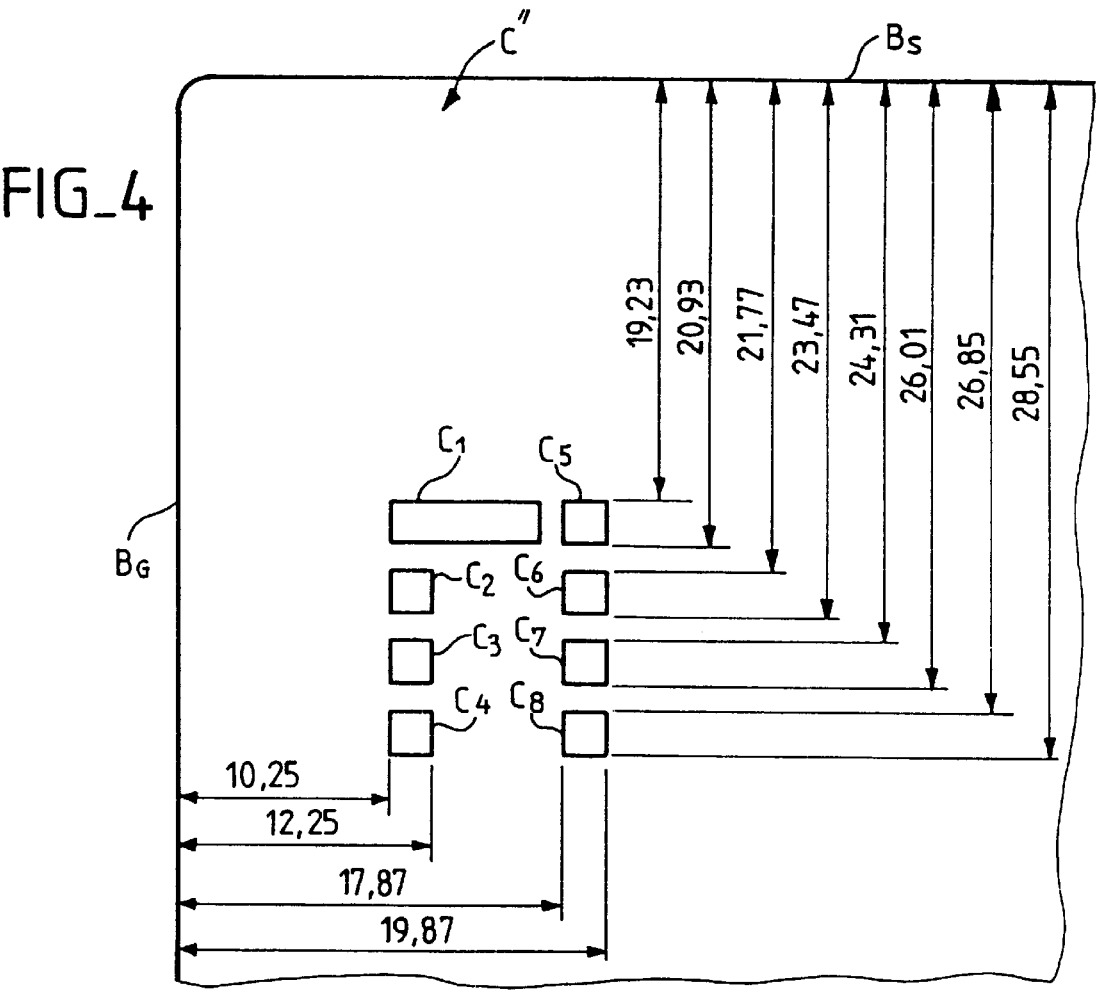
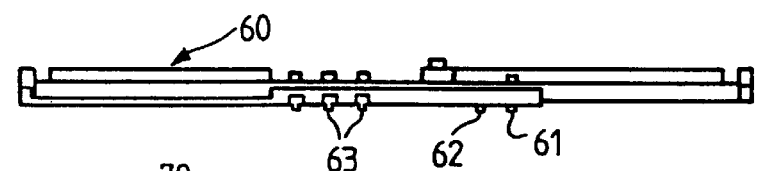
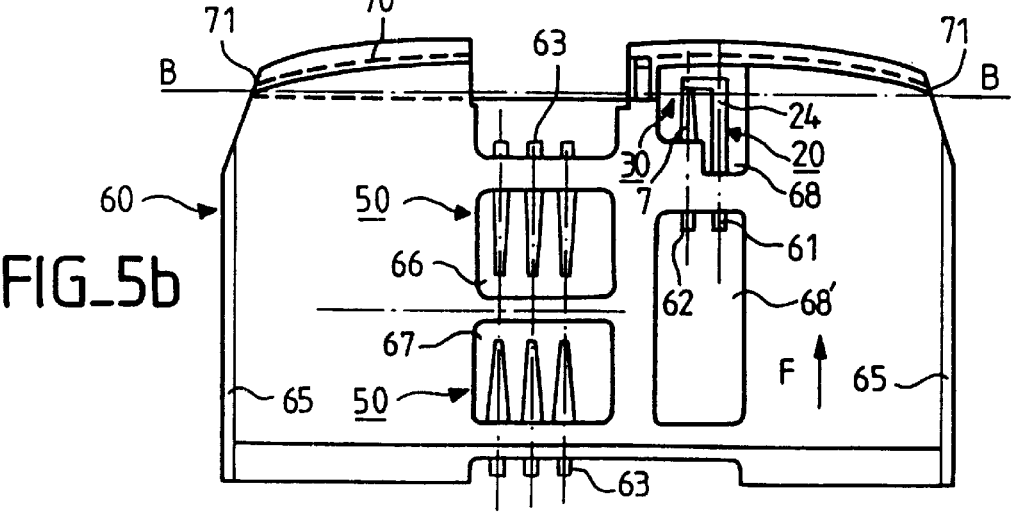

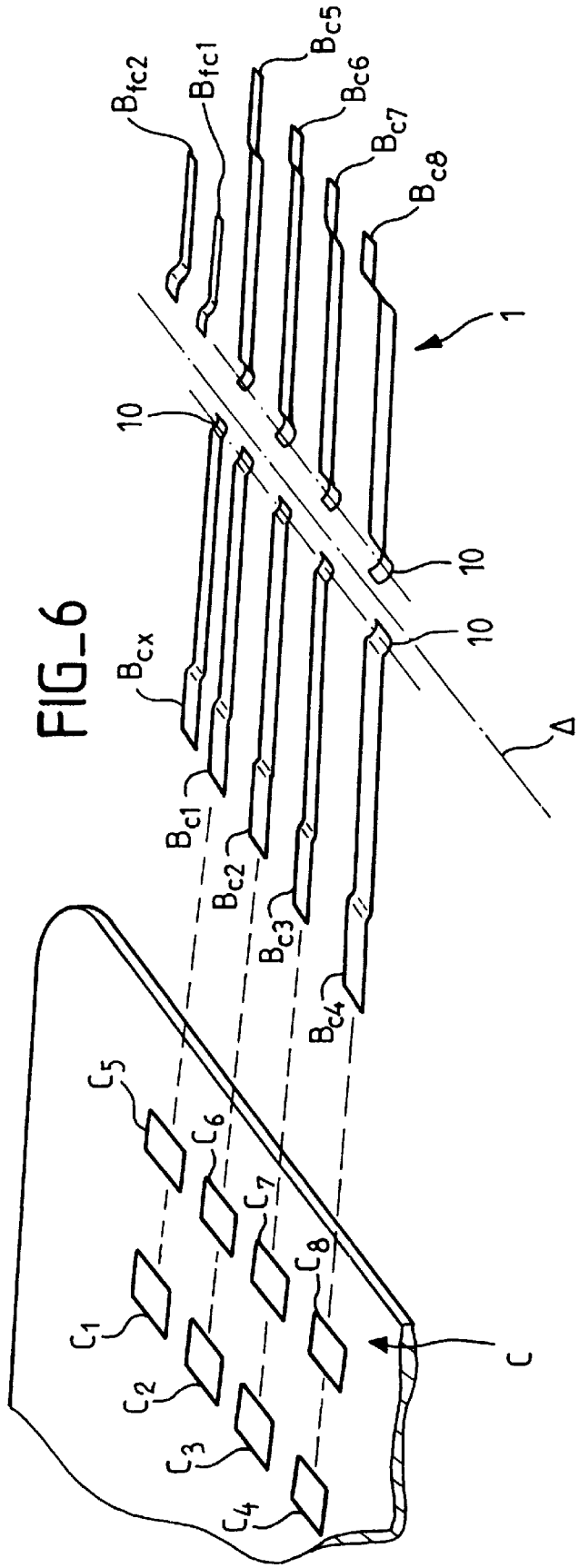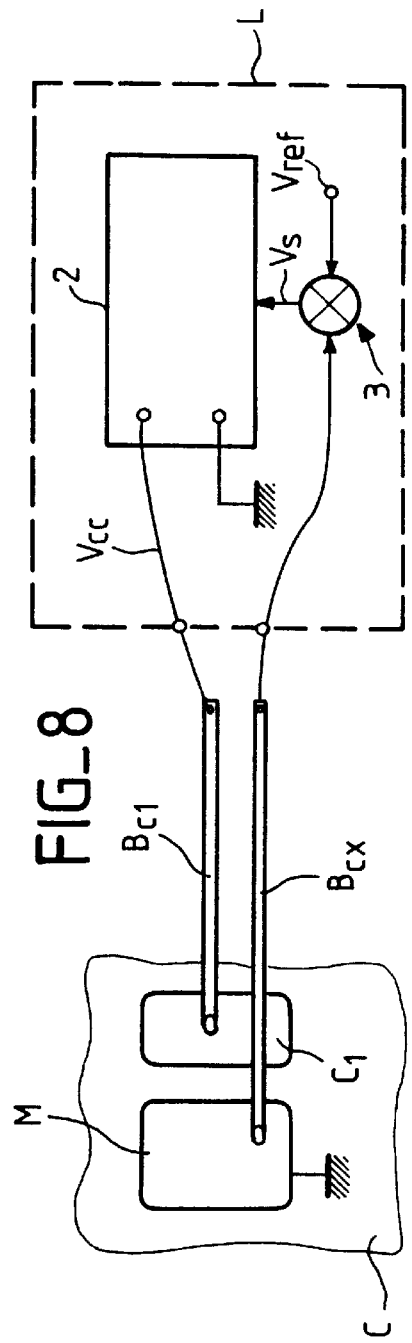

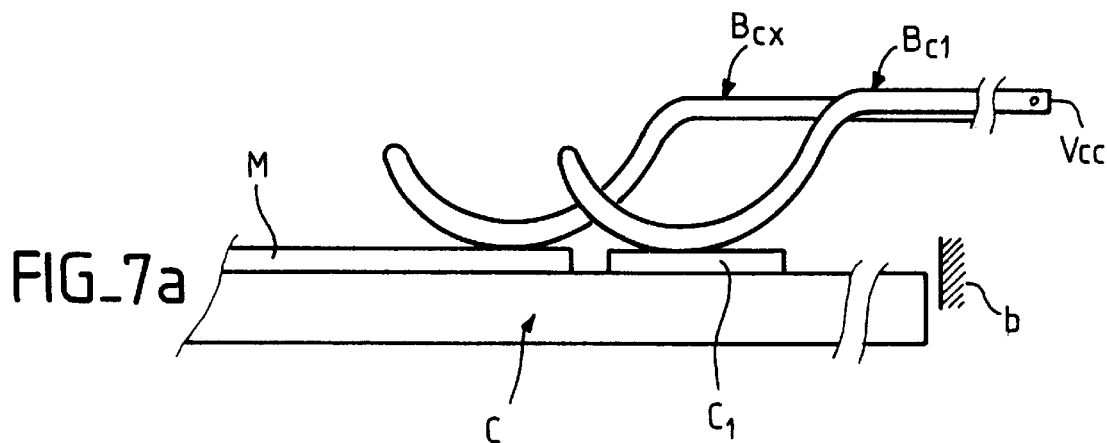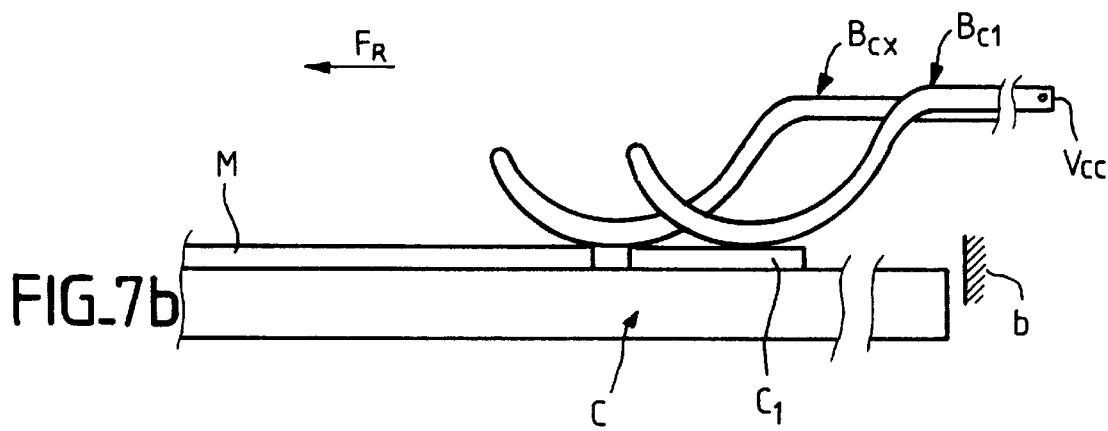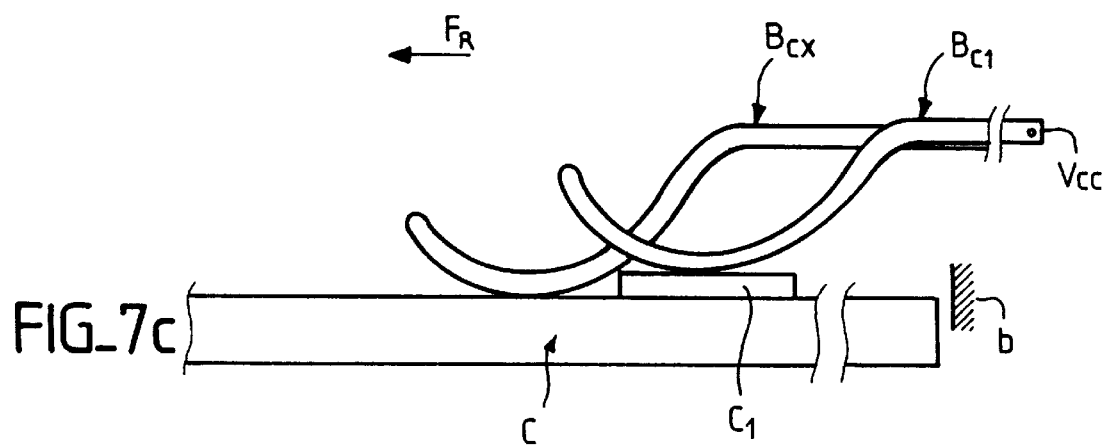

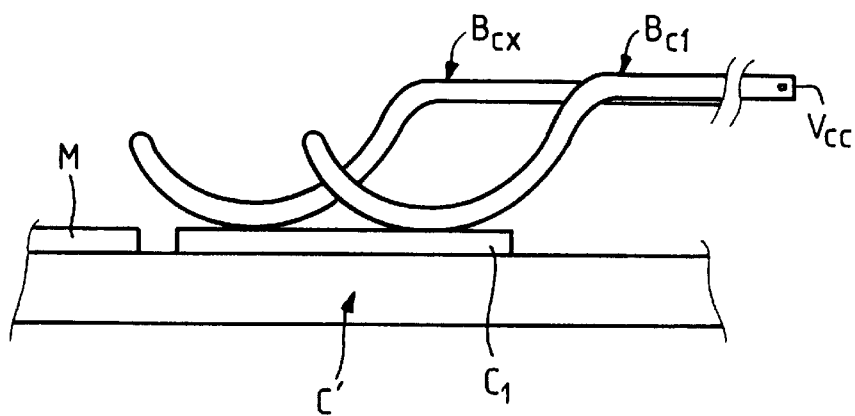
FIG_9a
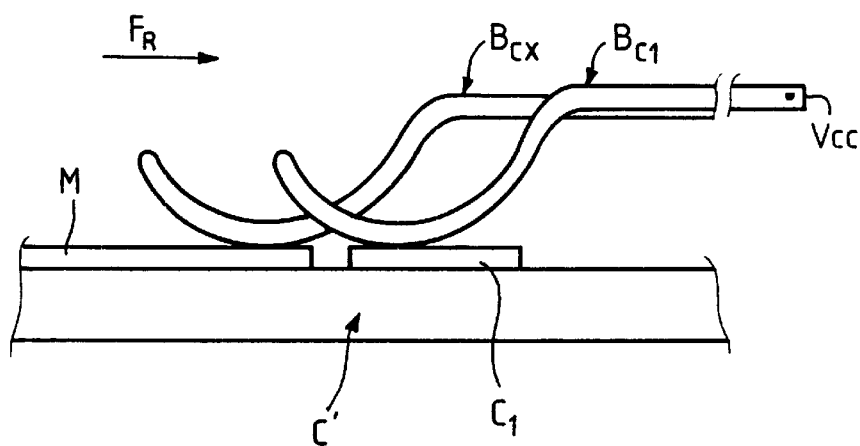
FIG_9b
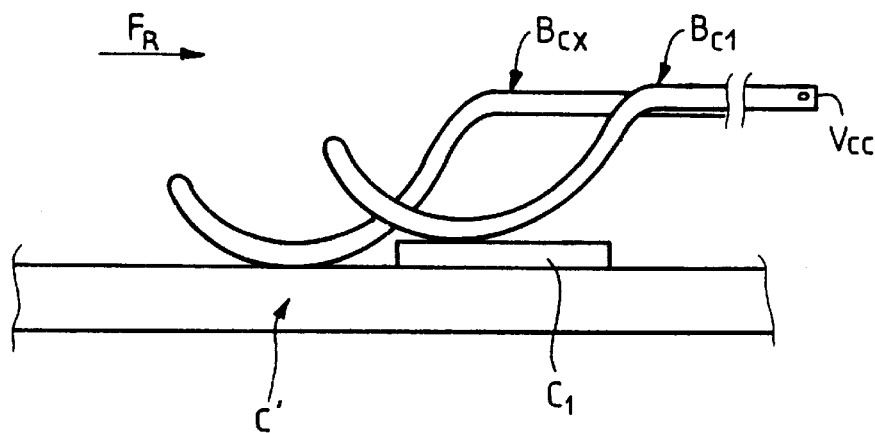
FIG_9c

CONNECTOR FOR A SMART CARD READER APPARATUS

BACKGROUND OF THE INVENTION

The invention concerns a connector for a microcircuit card reader apparatus.

In the context of the invention, "card" means all cards incorporating a hybrid or monolithic integrated circuit or "chip". The term "microcircuit" will be used for this hereinafter. They are, for example, cards in the "credit card" format also called "memory cards". The microcircuit of the card usually comprises a microprocessor or a microcontroller including memory circuits, for example of the "PROM" type. This type of card is designed to be inserted into special devices for reading and/or writing data. For simplicity, these devices are called "readers" hereinafter, although they can naturally write data and assure other ancillary functions (electrical power supply, testing, etc) referred to hereinafter. The data is stored in the aforementioned memory circuits, generally in encrypted form. It is therefore read from memory locations or written to memory locations.

Other logical architectures are used, especially for "electronic purse" or similar applications.

In all cases there are input-output members consisting of contact areas, also called "pads", flush with the surface of one of the main faces of the card. Various standards (ISO, AFNOR, etc) define the position of these contact areas. They are used not only for the aforementioned data inputs-outputs but also for supplying electrical power to the microcircuit and for carrying out various checks, depending on the application concerned (presence test, etc). The reader includes brush contacts that make galvanic contact with the aforementioned areas when the card is correctly inserted into a connector provided for this purpose.

Various trends are currently emerging, including:
the need to improve the security of card reader apparatus;
the trend to miniaturization and therefore to thinner card readers; and
the proliferation of microcircuit card applications plus a rapid fall in connector prices, in direct proportion to the expansion of the corresponding market.

Consequently, a number of problems have to be solved simultaneously, including:
1. The microcircuit of the card must be powered up only if the brush contacts are correctly positioned on the contact areas of the card. Powering up when incorrectly positioned not only prevents operation of the reader system but can damage the electronic circuits of the microcircuit.
2. In particular, the brushes for the data signals must be in position before the power supply voltage is applied to the microcircuit.
3. The user may withdraw the card during processing (this is known as "pull-out"). It is then necessary for the reader to react very quickly to cut off the power supply before the brushes reach prohibited positions (i.e. positions that are hazardous to the integrity of the circuits of the microcircuit).
4. The use of any non-standard object, for example an electrically conductive plate or a faked card, for whatever reason, whether by accident or in the case of attempted fraud, can also cause faults.

In all these cases it is necessary to disable the reader and to cut off the electrical power supply to limit the risk of damage to the circuits and/or attempts at fraud.

There are many reader systems aimed at reducing some or all of these problems. They can be classified into three major categories.

The first category comprises electronic detector systems. In systems of this type, an electrical test is carried out before applying an electrical voltage to the microcircuit, for example by measuring the resistance between the brush contacts. If these tests do not yield expected values within a given range the card has been inserted correctly or a foreign body has been inserted in its place.

This type of system has various drawbacks, including:
The system must operate with all the types of microcircuit with which commercially available cards are equipped, at least for a given application (bank cards, etc). However, the variety of microcircuits is too great to allow a single simple procedure.
Detection occurs on passing between a prohibited area and an operating area. Obviously, in the event of "pull-out", the system must react very quickly. The appropriate electronics is complex and therefore costly.

The second category comprises so-called "landing" systems. One example of a system of this kind is described in French patent application FR-A-2 628 901.

In these systems, the card is positioned against an abutment before it comes into contact with the brushes. Contact is made by relative displacement of the card towards the brushes perpendicularly to the surface of the card (main faces).

Security can be assured only by correct operation of the mechanical parts of the system. However, the latter can be backed up by an "end of travel" contact which disables the power up sequence if the card is not in the correct position. A power up sequence can be established by the height of the brushes or by initializing the following:
1. Only the "signal brush" type contact members of the reader must imperatively be in the correct position before power-up via the "power supply brush" and "ground brush" type contact members;
2. The electrical power supply system is always adapted to withstand a short-circuit, if only to deal with the insertion of electrically conductive unauthorized objects (a metal plate, for example). There is therefore no danger if only the brushes which make the connection to the power supply voltage or to ground are in an offset position when the power supply voltage is present.

Based on these findings, the aim of the invention is to provide a solution to the problems mentioned above whilst alleviating the drawbacks of the prior art systems, some of which have just been described in outline.

Document EP-A-0 139 593 discloses apparatus for reading microcircuit cards including:
a connector having a body supporting brush contact members adapted to come into electrical contact with conductive areas associated with said microcircuit of the card when the latter is inserted in the connector; and
an integrated circuit including means for monitoring insertion of the card into the reader and withdrawal of the card from the reader, said circuit being connected to at least some of said brush contact members and to the electronic circuit of the card reader.

SUMMARY OF THE INVENTION

In accordance with the invention, the microcircuit card reading system including a connector for apparatus for reading microcircuit cards including a body supporting brush contact members adapted to come into electrical contact with conductive areas associated with said microcircuit when the card is inserted into the connector, one of said brush contact members at a particular potential being adapted to supply electrical power to said microcircuit via one of said conductive areas and another of said brush contact members at ground potential being brought into contact with at least one of said conductive areas, at least some of the brush contact members being connected to an electronic circuit including means for monitoring insertion of the card into the reader and withdrawal of the card from the reader, said circuit being connected to the electronic circuit of the card reader, is characterized in that it includes and carries said electronic circuit and in that one of said brush contact members at a second particular potential is offset relative to the other brush contact members so that, after correct insertion of the card into the connector, one of the following two events occurs upon withdrawing the card from the connector, before the other brush contact members leave the contact areas of the card with which they are in contact:

short-circuiting of said brush member at the particular potential and said brush member at the ground potential; or particular variation of said second potential by an amount reaching a particular threshold.

The read frame in accordance with the invention therefore includes, in combination, an electronic circuit as described in PCT patent application FR 96/00156 filed Jan. 30, 1996 and an additional brush contact as described in EP-A-0 595 305.

In one version of the invention this brush contact, rather than being an additional brush contact, is a single contact member allocated to one of said contact areas that is offset relative to the brush contacts allocated to the other contact areas.

DESCRIPTION OF THE DRAWINGS

The invention will be better understood and other features and advantages will be apparent from a reading of the following description with reference to the accompanying drawings, in which:

FIG. 1 is a perspective view of a connector in accordance with the invention for a card reader;

FIG. 2 shows a first example of a microcircuit card conforming to the ISO standard, showing the location of the contacts and their principal geometrical characteristics;

FIG. 3 shows a first example of a microcircuit card conforming to the AFNOR standard, showing the location of the contacts and their principal geometrical characteristics;

FIG. 4 shows a first example of a microcircuit card conforming to the ISO standard, with a special configuration of the contacts;

FIGS. 5a and 5b show one example of a prior art connector for a microcircuit card reader;

FIG. 6 shows the arrangement of the contact members in one example of a connector constituting a first embodiment of the invention;

FIGS. 7a through 7c are detail views illustrating the operation of a connector adapted to receive cards in accordance with the ISO standard;

FIG. 8 shows the electronics specific to the card reader, associated with the connector of the invention;

FIGS. 9a through 9c are detail views illustrating the operation of a connector adapted to receive cards in accordance with the ISO standard.

DESCRIPTION OF THE PREFERRED EMBODIMENTS

In the FIG. 1 embodiment, the connector 1 for apparatus for reading a card C incorporating a microcircuit 3 has a body 2 supporting brush contact members B designed to come into electrical contact with associated conductive areas of said microcircuit $I_C$ when the card C is inserted in the connector 1.

In accordance with the invention, the connector 1 includes an electronic circuit $I_C$ connected to at least some of said brush contact members $C_1$ through $C_8$ and to the electronic circuit 4 of the card reader. The electronic circuit $I_C$ carried by the connector 1 includes means described in detail in PCT application FR 96/00156 for monitoring inserting the card C into the card reader and removing it therefrom.

FIG. 2 shows a fragment of a card C conforming to the ISO 7816 standard. This standard specifies the dimensions, the location and the assignment of the contact areas $C_1$ through $C_8$ flush with the surface of ID-1 type microcircuit cards. In reality the card may include one or more microcircuits. The input-output terminals of these microcircuits are connected to these contact areas $C_1$ through $C_8$.

The contact area $C_1$ through $C_8$ are organized in two rows each of four areas, $C_1$ through $C_4$ and $C_5$ through $C_8$, respectively, substantially parallel to each other and to the lefthand edge $B_G$ (in the figure) of the card C, this edge serving as an abutment. The figure also shows the top edge $B_S$ of the card C. FIG. 2 also indicates the principal geometrical characteristics defining the contacts $C_1$ through $C_8$ expressed as minimal and maximal distances (in millimeters) as stated in the aforementioned standard.

The latter does not define either the shape or the exact surface area of the conductive zone of each contact. Each conductive zone must have a substantially rectangular surface with minimal dimensions of 1.7 mm×2 mm. The maximal dimensions are not specified. It is merely stated that each contact must be electrically insulated from the other contacts. Furthermore, the surface of the card C between the contact areas $C_1$ through $C_8$ can be insulative or conductive: for example covered with metallization connected to the ground contact, for purposes of decoupling.

There are eight contacts, as previously indicated. They can be on the front or on the back of the card C, but the aforementioned distances are defined relative to the lefthand edge $B_G$ and the top edge $B_S$ of the card C.

The assignment of the contacts is set out in the table appended to the present description.

FIG. 3 shows one example of a microcircuit card C conforming to the older AFNOR standard using the same representation conventions as the card C.

There are significant differences concerning the distances between the contact areas $C_1$ through $C_8$ and the previously mentioned lefthand and top edges. Moreover, the location of the contact areas is also different. For example, the contact $C_8$ on the ISO card is in the same place as the contact $C_1$ on the AFNOR card.

The connector used in the card reader must allow for the standard employed, this constraint being common to the prior art connectors.

On the other hand, for the connector of the invention to operate correctly, it is also necessary for the edges of the "signal" contact areas (i.e. those other than $C_1$ and $C_5$) to be aligned with the contact areas $C_1/C_5$ or offset in the correct direction, which is the most usual case.

However, there can be card configurations that prohibit their use in the context of the invention. One example of this is shown by FIG. 4, which again shows a card C conforming to the aforementioned ISO standard. However, the power supply voltage contact area $C_1$ has an elongate shape and extends towards the area $C_5$.

This is the only limitation from which the invention suffers.

To give a more concrete example, FIGS. 5a and 5b show, by way of example, a prior art connector 60 seen in section taken along the line BB and from above, respectively. The brush contact members 50 bent at 63 are disposed in two rows in respective openings 66 and 67. The connector also includes a pair of "end of travel" detector contact members 20–30, bent at 60 and 61. The members 20 and 30 are disposed in an opening 68 and their bent ends in an opening 68'.

Note that to insert a card (not shown) in the direction of the arrow F, the front edge 70 (at the top in FIG. 5b), which is curved, has two lateral end points 71. These two points 71 define an abutment line BB for the card. The region 24 of the contact member 20 near the abutment line BB has a crook-shaped profile. When the card is inserted completely into the connector 60, it pushes back the contact member 20, which brings the two contact members 20 and 30 into contact and complete insertion of the card ("end of travel") is detected by appropriate electronic circuits of the reader (not shown) associated with the connector 60. This detection authorizes application of the power supply voltage to the brush associated with area $C_1$ of the card C (see FIG. 2, for example).

The invention has two principal embodiments.

In a first embodiment, a supplementary "voltage brush" type contact member is added in parallel with the standard "voltage brush", in a configuration described below. This supplementary brush is offset relative to the standard brush.

In a second embodiment, the "voltage brush" type contact member is not duplicated but merely offset relative to the row of contact members of which it forms part.

FIG. 6 is a schematic showing a connector 1 for insertion of a card C constituting the first embodiment of the invention. It is assumed, in the example shown in FIG. 6, that the card C to be inserted into the connector 1 conforms to the aforementioned ISO standard.

To simplify the diagram, FIG. 6 shows only the contact members and their arrangement in space. The other components: connector body and other accessories, can be entirely common to the prior art connectors, for example to the connector shown in FIGS. 5a and 5b.

In a manner that is known in itself, the connector 1 has two rows each of four brush contact members $B_{C1}$–$B_{C4}$ and $B_{C5}$–$B_{C8}$, respectively. Each of these brushes is adapted to make galvanic contact with a corresponding area $C_1$ through $C_8$ of the card C. They provide the contact members 50 from FIG. 5a.

A pair of "end of travel" contact members $B_{fc1}$ and $B_{fc2}$ may also be provided to detect complete and correct insertion of the card C into the connector 1. This is also known in itself.

FIG. 6 shows that the brushes $B_{C1}$–$B_{C4}$ and $B_{C5}$–$B_{C8}$ are in the form of thin, flexible, metal blades the distal ends 10 through 80 of which are crook-shaped. These blades are parallel to each other and the aforementioned distal ends face each other in pairs on opposite sides of an axis of symmetry A perpendicular to the blade.

In one version of the invention, an additional contact member $B_{CX}$ duplicates the "voltage brush" type contact member $B_{C1}$. This additional contact member $B_{CX}$ may be cut out from the same strip as the standard contacts and molded into the connector body at the same time as them, during manufacture of the connector (see FIG. 5b). In this case it is advantageous to reduce the width of one blade and to add a fifth alongside it.

The additional contact member $B_{CX}$ detects insertion and withdrawal of the card C and connects or disconnects the electrical power supply accordingly, as explained below.

It can also serve as the "end of travel" contact member, or complement the latter in order to enhance performance.

Still in the case of a card C conforming to the ISO standard, FIG. 7a shows the position of the brush contact members $B_{C1}$ and $B_{CX}$ relative to the area $C_1$ in the normal working position, i.e. with the card C correctly inserted into the connector 1. In this case the brush contact member $B_{CX}$ is in front of the brush contact member $B_{C1}$ but outside the area $C_1$.

The configuration shown in FIG. 7a assumes that the space between $C_1$ (see FIG. 5) and $C_5$ is occupied by a metal area M at ground potential. The card C is immobilized against an abutment b.

In this normal working condition, the brush contact member $B_{C1}$ is live at the power supply voltage $V_{CC}$, which is generally +5 V. The area $C_1$ is then at the same potential and the microcircuit of the card C (not shown) is supplied with electrical energy. Read and/or write operations can proceed normally.

If the card is withdrawn, either normally or "pulled out", the area $C_1$ is moved in translation in the direction of the arrow $F_R$ and the brush contact member $B_{CX}$ moves towards it. This situation is shown in FIG. 6b. Depending on the offset between the area $C_1$ and M and/or on the speed with which the card C is withdrawn, one of the following two events occurs:

a/ the additional brush contact member $B_{CX}$ causes a short-circuit with the area $C_1$;

b/ the voltage "read" by the additional brush contact member $B_{CX}$ changes.

In both cases a change of state is detected that can be exploited to cut off the electrical power supply.

However, the other contact members $B_{C2}$ through $B_{C8}$ do not have time to leave their respective areas $C_2$ through $C_8$.

FIG. 8 is a block schematic of an electronic circuit for controlling the status of the contact members $B_{C1}$ and $B_{CX}$.

The contact member $B_{C1}$ is connected to the output $V_{CC}$ of a regulated electrical power supply 2 in the reader L. The additional contact member $B_{CX}$ is connected to the input of a circuit 3, for example a circuit comprising a voltage comparator for comparing the voltage $V_{CC}$ and a reference voltage $V_{ref}$, for example 0 V, the area M being assumed to be grounded. In reality any reference voltage can be used, the function of the comparator circuit 3 being to detect variations of the potential at the additional contact member $B_{CX}$ having an amplitude greater than a predetermined threshold. This threshold allows for the power supply voltage tolerances, foreseeable interference, etc.

It is also assumed that the power supply 2 includes electronic circuits for detecting short-circuiting of the output (grounding of the voltage $V_{CC}$) and disconnecting the output. This operation will be done for the detection of the event "a/" referred to above: detection of a short-circuit.

Event "b/" (modification of the potential at the additional brush contact member $B_{CX}$) is detected by the comparator circuit 3. The output signal $V_S$ is transmitted to an input of the power supply 2 and disables the latter (removing the voltage from the brush contact member $B_{C1}$) when a change of potential of predetermined amplitude is detected.

The output signal $V_S$ can also be transmitted to an electronic system to deactivate the signal brushes.

FIG. 7c also shows the situation of withdrawal of the card $C_{ard}$, but in this example there is no ground area M (FIGS. 7a and 7b). When the card C is removed from the connector (arrow $F_R$) the potential at the additional contact member $C_{BX}$ changes and this change is detected by the comparator 3 (FIG. 8). The additional contact member $B_{CX}$ goes to the potential $V_{CC}$.

FIG. 9a shows the configuration to be used in the case of a card C to the AFNOR standard. The abutment (not shown) is on the opposite side to the area $C_1$. To be more precise, this figure shows the normal working state. The additional contact member $C_{BX}$ is offset towards the front of the contact member $C_{B1}$ but rests on the area $C_1$. The two contact members $C_{BX}$ and $C_{B1}$ are therefore at the same potential $V_{CC}$. It is also assumed that a ground area, formed by the area $C_5$, adjoins the area $C_1$.

When the card C is withdrawn, for example pulled out, the ground area $C_5$ moves towards the additional contact member $C_{BX}$, as shown in FIG. 9b.

As previously, two distinct events can be detected:
a/ a short-circuit between the ground area $C_5$ and the voltage area $C_1$ because the additional contact member $B_{CX}$ is resting on both areas at once;
b/ a change of potential at the additional contact member $B_{CX}$, which goes from the value $V_{CC}$ (for example +5 V) to 0 V.

In reality, in this latter case, a voltage variation greater than a given threshold is sufficient. It is therefore not necessary to wait for the voltage to fall to zero.

Also, as previously, the other contact members $B_{C2}$ through $B_{C8}$ have not had time to leave the areas $C_2$ through $C_8$, respectively.

As previously, these two events can be managed using the electronic circuits of FIG. 8.

Finally, if there is no ground area near the area $C_1$, as shown by FIG. 9c, only event "b/" occurs and can be detected by the same circuits (to be more precise by the comparator 3).

The embodiment just described achieves perfectly the objectives set for the invention.

However, as indicated, two separate states or events must be detectable, which requires the presence in the reader of electronics controlling the additional contact member $B_{CX}$.

In the second embodiment of the invention (not shown) the "voltage brush" type contact member is offset slightly relative to the other contact members in the same row: "power supply brushes". In this case, no additional contact member $B_{CX}$ is needed. The embodiment is therefore simpler.

In the case of a card to the ISO standard, it is sufficient to offset the "power supply brush" type contact member $B_{C1}$ towards the abutment relative to the other contact members: "signal brushes". If the "power supply" area $C_1$ is not longer, on the abutment side, than the "signal" areas, this offset is sufficient to assure correct sequencing.

However, the aforementioned ISO standard does not guarantee that this requirement is met and many bank cards in fact have an unsuitable "power supply" area configuration.

This embodiment is therefore reserved to specific applications.

In the case of cards to the AFNOR standard, the contact member $B_{C1}$ is offset on the abutment side relative to the "signal brush" type contact member. Referring again to FIGS. 9a through 9c, the contact member $B_{C1}$ is substituted for the additional contact member $B_{CX}$.

This assures correct sequencing by cutting off the power supply, possibly after the latter is short-circuited.

The principal advantage of the second embodiment is naturally that it is not necessary to provide any control electronics for the state of the brushes. Further, only a slight modification of the contact member $B_{C1}$ is necessary.

However, as already mentioned, some cards are incompatible because of the shape of the area $C_1$, which shape cannot be guaranteed to satisfy the standards.

Naturally, for the invention to be effective, a number of requirements must be met. They are essentially concerned with compliance with tolerances on the manufacture and the positioning within the connector of the contact member $B_{C1}$ relative to the area $C_1$, when the card C is in the abutment position, and the offset between the standard contact member $B_{C1}$ and the additional contact member $B_{CX}$, when present (first embodiment).

To make the example more concrete, the center of the area $C_1$ is at a distance equal to 18.87 mm from the card abutment b, with a tolerance of +0.4 mm maximum and −0.5 mm maximum. As already mentioned, the width of the area $C_1$ in a direction parallel to $F_R$ is 2 mm minimum and the distance between $C_1$ and an area contiguous with $C_1$ is 0.2 mm.

The manufacturing accuracy to be obtained must be compatible with these values. This requirement concerns not only the contact members themselves and their relative positions, but also other operations, such as molding, etc.

Nevertheless, all these operations are the result of technological choices that will be evident to the skilled person.

A reading of the foregoing description shows clearly that the invention has many advantages, including the advantages indicated below.

Where accuracy is concerned, in the case of a prior art connector provided with "end of travel" type contact members, guaranteeing a proper sequence is dependent on:
the mechanical precision of the aforementioned contact members;
the position of the contact areas relative to the edge of the card;
the position of the brush contact members relative to the "end of travel" type contact members.

In the case of a connector in accordance with the invention, the accuracy depends on:
the required offset of the brush contact members, obtained by a tool for cutting and bending the brushes;
the accuracy in the dimensions and the spacing of the contact areas of the card, produced by cutting or equivalent processes.

The overall accuracy obtained is better than that obtained with the aid of "end of travel" type contact members alone.

The overall size can be smaller than that of equivalent prior art connectors because the "end of travel" type contact members can be omitted, which can allow a reduction in thickness.

On the contrary, if the "end of travel" type contact members are retained, the provisions of the invention, by accumulative effect, improve reliability.

Finally, the cost may be reduced if the "end of travel" type contact members are omitted, even in the first embodiment, as the additional blade merely introduces an additional tooling cost.

APPENDIX

| Contact | Name and function |
|---|---|
| $C_1$ | VCC (Power supply voltage) |
| $C_2$ | RST (Reset signal) |
| $C_3$ | CLK (Clock signal) |
| $C_4$ | Reserved for future use |
| $C_5$ | GND (Ground) |
| $C_6$ | VPP (Programming voltage) |
| $C_7$ | I/O (Input/output data) |
| $C_8$ | Reserved for future use |

I claim:

1. Microcircuit card reading system including a connector for apparatus for reading microcircuit cards (C) including a body supporting brush contact members (B) adapted to come into electrical contact with conductive areas associated with said microcircuit when the card (C) is inserted into the connector (1), one ($B_{C1}$) of said brush contact members at a particular potential ($V_{CC}$) being adapted to supply electrical power to said microcircuit via one of said conductive areas and another of said brush contact members at ground potential being brought into contact with at least one of said conductive areas, at least some of the brush contact members (B) being connected to an electronic circuit ($I_C$) including means for monitoring insertion of the card (C) into the reader and withdrawal of the card (C) from the reader, said circuit ($I_C$) being connected to the electronic circuit (4) of the card reader, wherein said connector includes and carries said electronic circuit ($I_C$) and in that one ($B_{CX}$) of said brush contact members at a second particular potential is offset relative to the other brush contact members ($B_{C1}$–$B_{C8}$) so that, after correct insertion of the card (C) into the connector (1), one of the following two events occurs upon withdrawing the card from the connector, before the other brush contact members ($B_{C2}$–$B_{C8}$) leave the contact areas ($C_2$–$C_8$) of the card (C) with which they are in contact:

short-circuiting of said brush member ($B_{C1}$) at the particular potential and said brush member at the ground potential; or particular variation of said second potential by an amount reaching a particular threshold.

2. System according to claim 1, wherein said brush contact member ($B_{CX}$) offset relative to the other brush contact members is a single contact member allocated to one ($C_1$) of said contact areas that is offset relative to the brush contacts allocated to the other contact areas.

3. System according to claim 1, wherein said brush contact member offset relative to the other brush contact members is an additional contact member ($B_{CX}$) adjacent said brush contact member ($B_{C1}$) adapted to supply electrical power to said microcircuit via said power supply conductive area ($C_1$) and duplicating said component.

4. System according to claim 3, wherein, said microcircuit card (C) conforming to the ISO standard, said additional brush contact member ($B_{CX}$) is offset relative to said brush contact member ($B_{C1}$) adapted to supply electrical power to said microcircuit by an amount such that it remains outside the power supply contact area ($C_1$) when the card (C) is inserted correctly into the connector and approaches it when it is withdrawn from the latter so as to cause one of said two events.

5. System according to claim 4, wherein said potential variation is detected when the potential of said additional contact member ($B_{CX}$) reaches said first particular potential ($V_{CC}$).

6. System according to claim 4, wherein, the surface of said card (C) including additional areas (M) disposed between said contact areas and at the ground potential, said additional brush contact member ($B_{CX}$) rests on one of said areas (M) when the card (C) is inserted correctly into the connector so as to be at the ground potential and in that said short-circuit event is caused by this additional area (M) coming into electrical contact with the power supply contact area ($C_1$) via the additional brush contact member ($B_{CX}$) when the card (C) is withdrawn.

7. System according to claim 3, wherein, said microcircuit card (C) conforming to the AFNOR standard, said additional brush contact member ($B_{CX}$) offset relative to said brush contact member ($B_{C1}$) adapted to supply electrical power to said microcircuit by an amount such that it remains inside the power supply contact area ($C_1$) when the card (C) is inserted correctly into the connector and leaves the latter on withdrawal of the card (C) so as to cause one of said two events and in that said first particular potential ($V_{CC}$) and said second particular potential are the same.

8. System according to claim 7, wherein said potential variation is detected when the potential at said additional contact member ($B_{CX}$) is less than particular first potential of said particular threshold.

9. System according to claim 7, wherein, the surface of said card (C) including additional areas (M) disposed between said contact areas and at the ground potential, said additional brush contact member ($B_{CX}$) is moved towards one of said areas (M) when the card (C) is withdrawn and in that said short-circuit event is caused by the connection of this additional area (M) and the power supply contact area ($C_1$) by the additional brush contact member ($B_{CX}$) on withdrawing the card (C).

10. System according to claim 1 it further includes a pair of "end of travel" contact members ($B_{fc1}$–$B_{fc2}$) adapted to detect complete insertion of said card (C).

* * * * *